Sept. 5, 1944.  A. J. PORSKIEVIES  2,357,762
POWER TRANSMISSION
Filed July 31, 1941  4 Sheets-Sheet 1
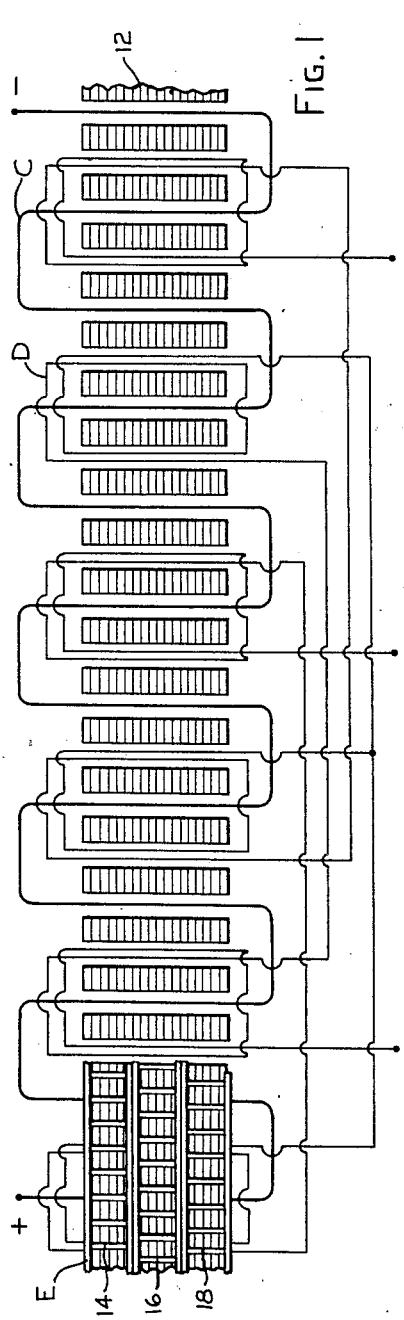
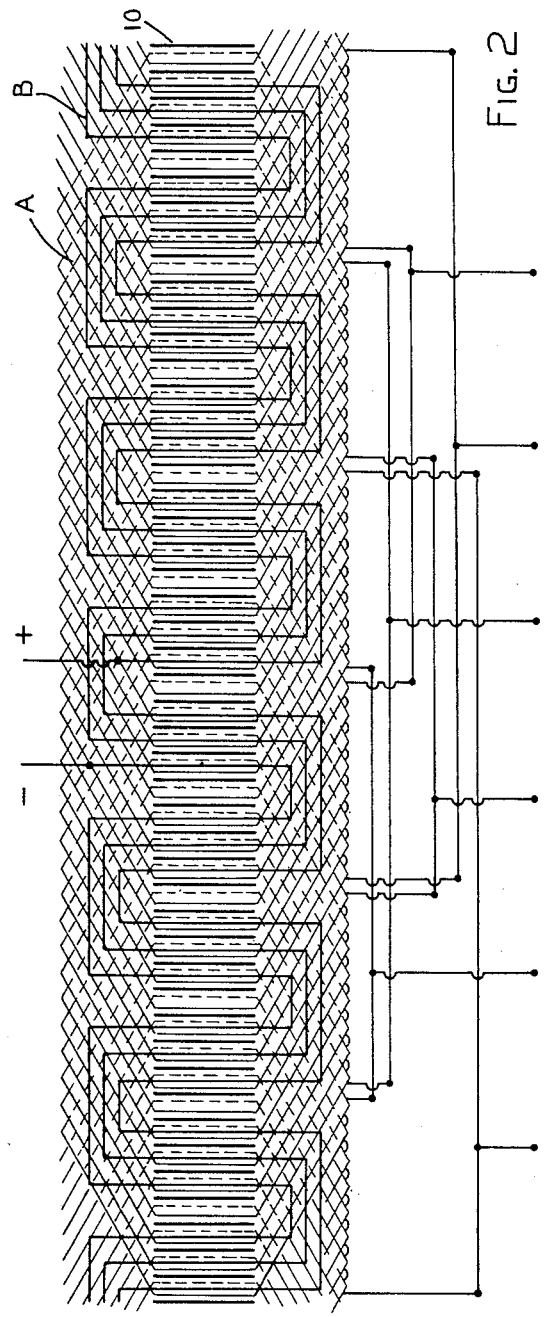
*INVENTOR*
ANTHONY J. PORSKIEVIES
BY
*ATTORNEY*

INVENTOR
ANTHONY J. PORSKIEVIES
BY
ATTORNEY

Sept. 5, 1944.  A. J. PORSKIEVIES  2,357,762

POWER TRANSMISSION

Filed July 31, 1941  4 Sheets-Sheet 3

INVENTOR
ANTHONY J. PORSKIEVIES
BY
Ralph L. Tweedale
ATTORNEY

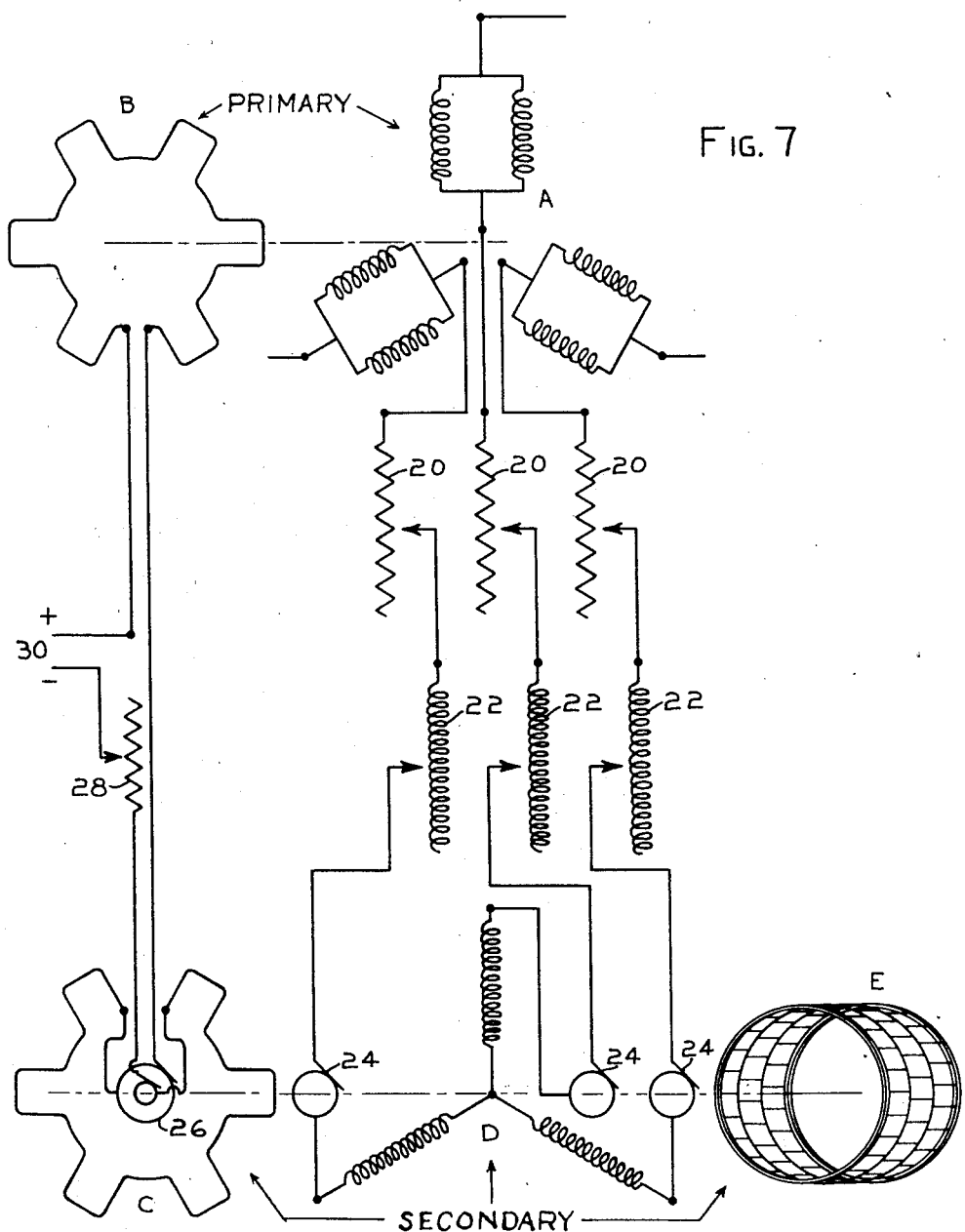

Patented Sept. 5, 1944

2,357,762

UNITED STATES PATENT OFFICE 2,357,762

POWER TRANSMISSION

Anthony J. Porskievies, Atlantic Highlands, N. J., assignor to Vickers Incorporated, Detroit, Mich., a corporation of Michigan Application July 31, 1941, Serial No. 404,770

10 Claims. (Cl. 172—274)

This invention relates to power transmission systems, more particularly of the type comprising an alternating-current power source and an induction motor connected thereto.

It is an object of the present invention to provide an improved variable-speed, alternating-current motor capable of operation not only over a wide range of speeds and at any desired speed within that range, but also over a wide range of loads.

It is a further object to provide a motor of this character operable at increased torque in the lower speed range and capable of maintaining a constant horsepower output over its full speed range.

It is also an object to provide a motor of this character in which the use of a commutator is eliminated.

A further object is to provide a variable-speed, alternating-current motor of the induction motor type having both short-circuited and phase-wound secondary windings together with certain direct-current control windings arranged to variably modify the flux intensity in the motor field structure and thereby control the impedance of the alternating-current power windings.

It is also an object to provide in an induction motor of this character additional means for controlling the power current flowing in the primary and secondary windings.

Further objects and advantages of the present invention will be apparent from the following description, reference being had to the accompanying drawings wherein a preferred form of the present invention is clearly shown.

In the drawings:

Figure 1 is a developed view showing diagrammatically the windings on a rotor of a preferred form of the present invention.

Figure 2 is a developed view showing the stator windings.

Figure 7 is a simplified schematic wiring diagram of the complete motor.

The form of the invention selected for illustration comprises the usual stator element 10 and rotor element 12 upon which the windings of the motor are placed. One element, in this case the stator, is provided with an alternating-current primary winding designated the A winding and a direct-current winding designated the B winding. The other element carries a direct-current C winding and an alternating-current secondary D winding and a short-circuited squirrel cage E winding.

The A winding is formed similarly to the usual multipolar primary winding of the conventional induction motor, that illustrated being of the lap-wound type and connected for three-phase operation at two poles per phase with a one-half coil pitch.

The B winding is wound in wave form and has its conductors positioned in the same slots as those carrying the A winding. These conductors are positioned so as to produce twelve alternate poles or double the number of pole phase groups on the A winding. The A and B windings are preferably so proportioned that the alternating flux set up by the A winding produces a subnormal saturation of the core, that is, less saturation than is customary in conventional induction motor practice. The B winding sets up an additional constant flux which, together with the flux of the A winding, will bring the core saturation more or less up to normal, depending upon the energization of the B winding.

The C winding is positioned upon the rotor with its conductors arranged in the slots thereof, and the winding is preferably also formed as a continuous wave winding. This winding creates a number of alternate magnetic poles in the rotor equal to the number of poles in the stator induced by the B winding.

The D winding, as illustrated, comprises a plurality of bars arranged in certain of the rotor slots and provided with end connections to produce two resultant and two consequent poles per phase on three-phase energization. Thus, the four conductor bars illustrated in each adjacent pair of slots may be provided with end connections placing the four bars in series to give in effect a two-turn winding around the resulting poles. This two-turn winding may be connected in series with that diametrically opposite and thus constitute the complete D winding circuit for one of the phases. Under some conditions it may be found desirable to construct the D winding with a larger number of turns per pole.

The E winding may be a conventional squirrel cage winding, but it is preferred to utilize an improved form consisting of three separate sections 14, 16 and 18, each extending over one-third the axial length of the rotor core. Each section has its own short-circuiting ring, although the rings on either side of the central section 16 may be made integral and of double the thickness of the outside ring. The longitudinal conductor bars of each section are preferably staggered relative to those of the other sections by one-third of the conductor pitch.

Figure 3:
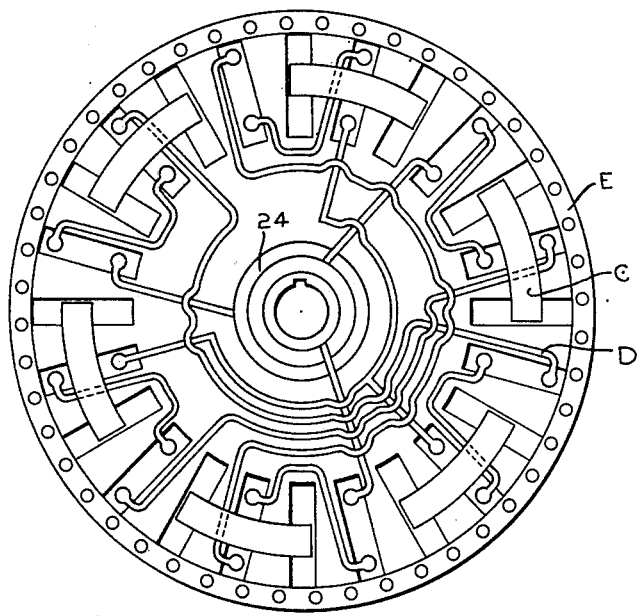
Figure 3 is an end view of the rotor showing the end connections and slip ring leads of the rotor at the end where the alternating-current leads are brought out.
Figure 4:
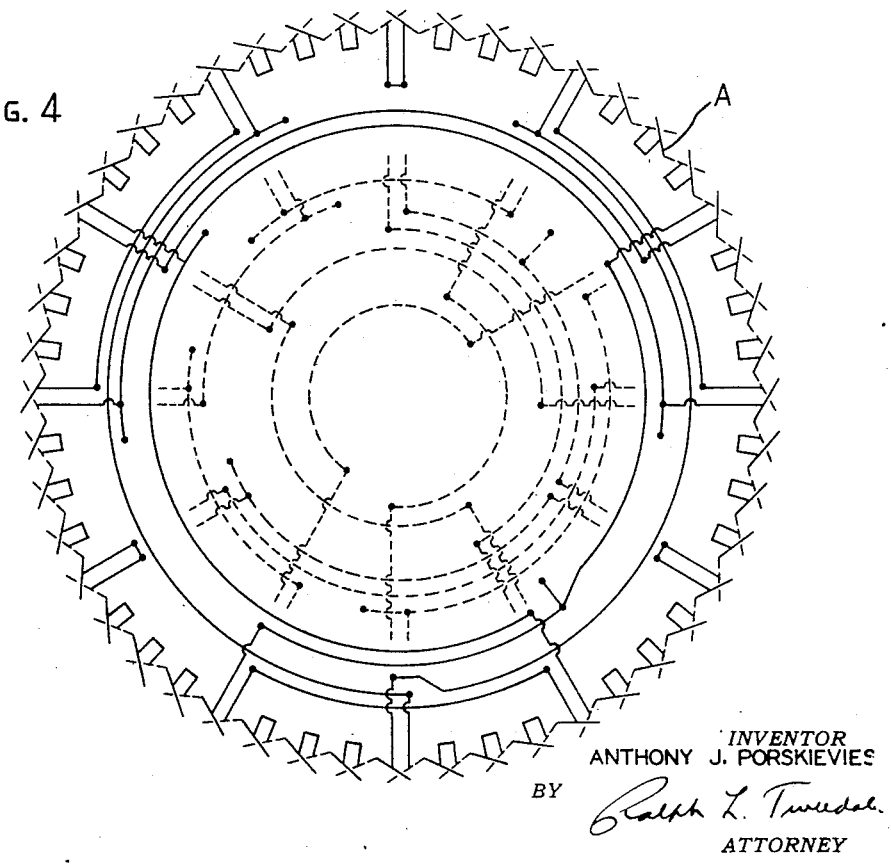
Figure 4 is a diagrammatic end view showing the end connections of the stator for a two-pole connection and showing in dotted lines an alternative connection for four poles.
Figure 5:
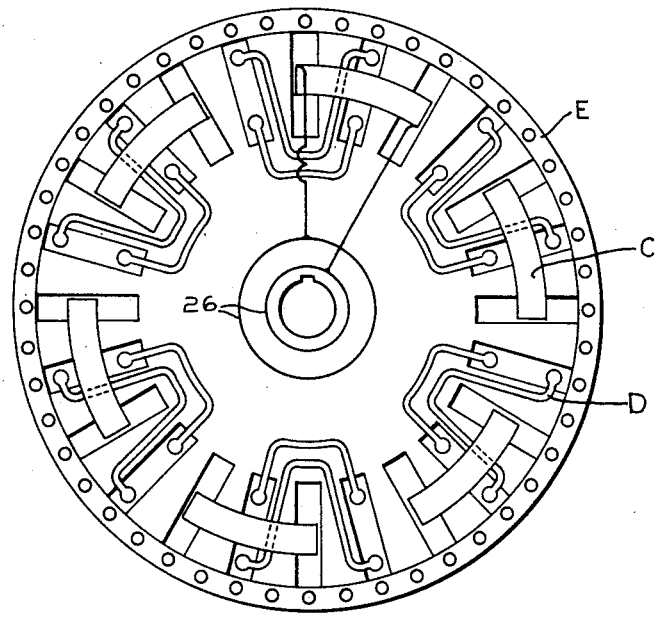
Figure 5 is an end view of the rotor showing the end connections and slip rings at the end where the direct-current leads are brought out.
Figure 6:
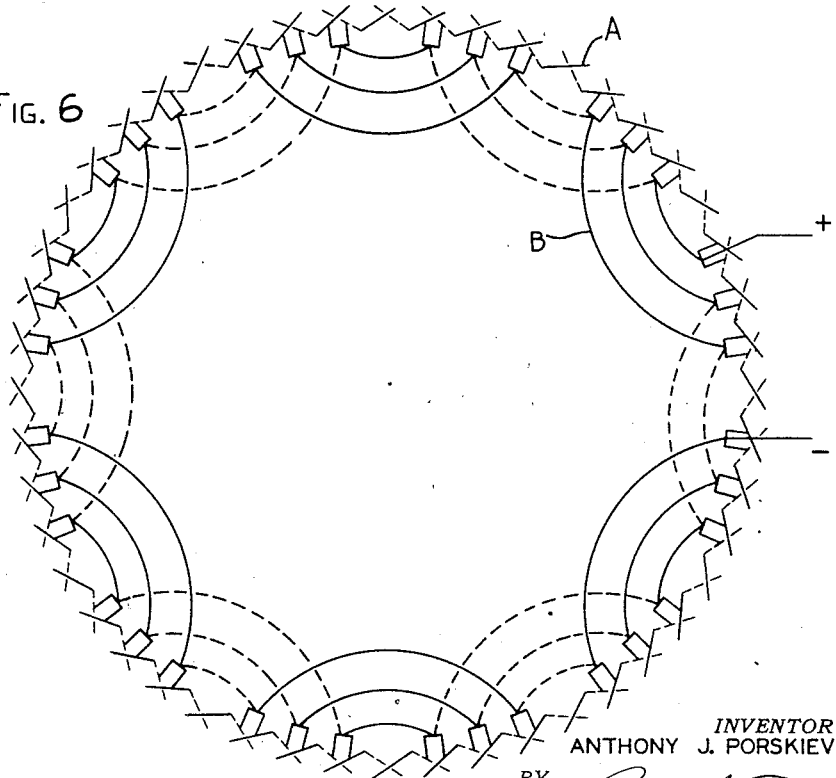
Figure 6 is an end view of the stator at the end opposite that shown in Figure 4.

The A winding is shown in Figure 2 as arranged in six pole-phase groups and connected for two-pole operation only. In Figure 4 the same winding is connected in twelve pole-phase groups arranged for optional connection for either two-pole or four-pole operation by the use of suitable pole-changing switching mechanism, not shown. It will be noted that in either arrangement the neutral connections of the A winding are brought out separately and, as shown in Figure 7, are connected through separate adjustable resistances 20 and adjustable reactances 22 to the slip rings 24. The latter in turn are connected to the three line terminals of the D winding which is star connected.

The B and C windings are connected in series through the medium of the slip rings 26 and the adjustable resistance 28 with a source of direct current indicated at 30. The latter may conveniently comprise suitable rectifiers connected across one phase of the three-phase, alternating-current power supply $L^1$—$L^2$—$L^3$.

For operation of the motor at full rated speed and under full load torque, the resistances 20 and the reactors 22 are shunted, and the resistance 28 is open circuited. Under these conditions, the A winding sets up the customary rotating field and, in conjunction with the E winding, will induce secondary current therein causing the motor to start and come up to a speed closely approaching synchronous speed.

It will be noted that the current traversing the A winding also traverses the D winding by reason of its series connection therewith. It will be noted that the diametrically opposite coils of the D winding are connected in opposition to one another so that the net torque produced by the conductors at any instant is zero. Likewise, the net E. M. F. induced in each phase at any instant is also zero. The fact that the primary current must also traverse the D winding sets up a field which rotates relative to the rotor at a speed corresponding to the line frequency. Since the E winding is fixed on the rotor, this D winding field cuts the E winding conductors at line frequency speed at all times.

The B winding is also in position to be cut by the rotating field of the A winding, but it will be noted that, under each pole induced by the A winding at a given instant, there are equal numbers of B winding conductors to carry current in one direction and to carry current in the opposite direction so that no alternating current is induced in the B winding.

The same situation is true with regard to the C winding although, since this is positioned on the rotor, its conductors cut the primary rotating field only at the very low slip frequency.

If it is desired to operate the motor at a somewhat slower speed and with the possibility of developing higher torque, the adjustable resistance 28 is brought into play to permit some direct current to flow through the B and C windings. Likewise, the resistances 20 may be adjusted to add some resistance to the circuit including the A and D windings.

The effect of the B and C windings is to slow the motor down by reason of the electromagnetic drag tendency between the poles set up by these windings on the stator and rotor, respectively. Since these windings set up an equal number of like poles, it will be seen that, if these windings alone were energized, the rotor would be locked to the stator by the electromagnetic attraction of the poles thus set up. When the B and C windings, however, are given a relatively low energization and, at the some time, the alternating-current windings are fully energized, this locking tendency is ineffective to completely stop the rotor but exerts sufficient drag to reduce the speed significantly.

Viewed in another light, the direct-current energization of the B winding increases the flux density in the stator and thereby reduces the impedance of the A winding. The same effect is felt in the rotor, reducing the impedance of the D winding. Thus, more power currents are permitted to flow through the A and D windings resulting in increased torque which may be equal to or greater than the reduction in torque caused by the drag of the B and C windings. The magnitude of this increase in alternating-current flow may be suitably adjusted by an adjustment of the resistances 20. At the same time, the D winding, which at any speed keeps on inducing currents in the E winding conductors at line frequency, serves thereby to control the impedance of the E winding to currents induced by the primary or A winding flux. In this manner, a strong control may be exercised over the power currents flowing in the motor so that torque may be maintained high throughout the speed range.

The speed of the motor may thus be adjusted to any reduced value over a considerable range by increasing the direct-current energization of the B and C windings. At the sime time, adjustments for torque may be obtained at the adjustable resistances 20. In a case where the load torque is very low, it may be necessary to introduce some reactance into the alternating-current circuit in order to prevent the motor speed from rising under the reduced load. It will thus be seen that by suitable adjustment of the resistances 20 and 28 and, under low load conditions, of the reactors 22, the motor may be operated a any speed over a wide range and against load torque such as to maintain a constant horsepower output at all speeds.

The range of the motor may be increased by providing pole-changing connections as illustrated diagrammatically in Figure 4 since this medium has been found to provide more efficient operation at lower speeds in addition to extending the lower limit of the speed range considerably. As one example of the performance of characteristics which may be achieved with the present invention, a motor has been constructed having a constant output horsepower characteristic over a speed range of 600 R. P. M. up to 3600 R. P. M. which is a range of six to one. Throughout this range the output torque may be maintained in inverse relation to the speed so that the product of speed and torque remains a constant value.

While the form of embodiment of the invention as herein disclosed constitutes a preferred form, it is to be understood that other forms might be adopted, all coming within the scope of the claims which follow.

What is claimed is as follows:

1. In combination, a source of alternating current, a source of direct current, an adjustable-speed, alternating-current, electric motor of the induction motor type having relatively rotatable members, a multiphase, polar-wound A winding on one of said members, a direct-current B winding on said one member, a direct-current C winding on the other member, a multiphase D winding on the other member, and a squirrel cage E winding on the other member, said A and D windings being connected together in an alternating-current circuit, means for varying the impedance of said circuit, and means for varying the direct-current energization of the B and C windings whereby said motor may be operated at any speed over a substantial range and under any load within its designed capacity.

2. In combination, a source of alternating current, a source of direct current, an adjustable-speed, alternating-current electric motor of the induction motor type having relatively rotatable members, a multiphase, polar-wound A winding on one of said members arranged to produce a flux of subnormal density, a direct-current B winding on said one member, a direct-current C winding on the other member serving to increase the flux density and thereby reduce the impedance of the A winding, a multiphase D winding on the other member, and a squirrel cage E winding on the other member, said A and D windings being connected together in an alternating-current circuit, means for varying the impedance of said circuit, and means for varying the direct-current energization of the B and C windings whereby said motor may be operated at any speed over a substantial range and under any load within its designed capacity.

3. In combination, a source of alternating current, a source of direct current, an adjustable-speed, alternating-current electric motor of the induction motor type having relatively rotatable members, a multiphase, polar-wound A winding on one of said members, a direct-current B winding on said one member, a direct-current C winding on the other member, a multiphase D winding on the other member, and a squirrel cage E winding on the other member, said A and D windings being connected together in an alternating-current circuit, adjustable resistance and reactance in said circuit for varying the alternating-current flow therein, and means for varying the direct-current energization of the B and C windings whereby said motor may be operated at any speed over a substantial range and under any load within its designed capacity.

4. In combination, a source of alternating current, a source of direct current, an adjustable-speed, alternating-current electric motor of the induction motor type having relatively rotatable members, a multiphase, polar-wound A winding on one of said members, a direct-current B winding on said one member, a direct-current C winding on the other member, a multiphase D winding on the other member, and a squirrel cage E winding on the other member, said A and D windings being connected together in an alternating-current circuit with one winding in series with the neutral connections of the other to provide a series Y connection, means for varying the impedance of said circuit, and means for varying the direct-current energization of the B and C windings whereby said motor may be operated at any speed over a substantial range and under any load within its designed capacity.

5. In combination, a source of alternating current, a source of direct current, an adjustable-speed, alternating-current electric motor of the induction motor type having relatively rotatable members, a multiphase, polar-wound A winding on one of said members, a direct-current B winding on said one member, a direct-current C winding on the other member, a multiphase D winding on the other member wound to produce a number of poles different from the number produced by the A winding, and a squirrel cage E winding on the other member, said A and D windings being connected together in an alternating-current circuit, means for varying the impedance of said circuit, and means for varying the direct-current energization of the B and C windings whereby said motor may be operated at any speed over a substantial range and under any load within its designed capacity.

6. In combination, a source of alternating current, a source of direct current, an adjustable-speed, alternating-current electric motor of the induction motor type having relatively rotatable members, a multiphase, polar-wound A winding on one of said members, a direct-current B winding on said one member, a direct-current C winding on the other member, a multiphase D winding on the other member, and a squirrel cage E winding on the other member, slip rings for connecting the A winding to the D winding and the B winding to the C winding, said A and D windings being connected together in an alternating-current circuit, means for varying the impedance of said circuit, and means for varying the direct-current energization of the B and C windings whereby said motor may be operated at any speed over a substantial range and under any load within its designed capacity.

7. In combination, a source of alternating current, a source of direct current, an adjustable-speed, alternating-current electric motor of the induction motor type having relatively rotatable members, one carrying a primary exciting winding and the other carrying both a short-circuited secondary winding and an auxiliary secondary winding in series with the primary winding and in inductive relation to the primary flux, and at least one winding connected to the direct-current source in inductive relation to said windings to control the impedance of the primary winding circuit and thereby control the amount of power current flowing in the secondary windings.

8. In combination, a source of alternating current, a source of direct current, an adjustable-speed, alternating-current electric motor of the induction motor type having relatively rotatable members, one carrying a primary exciting winding and the other carrying both a short-circuited secondary winding and an auxiliary secondary winding in series with the primary winding and in inductive relation to the primary flux, at least one winding connected to the direct-current source in inductive relation to said windings to control the impedance of the primary winding circuit and thereby control the amount of power current flowing in the secondary windings, and means including adjustable resistance and reactance in circuit with the primary and auxiliary secondary windings to further control the power current in the primary winding.

9. In combination, a source of alternating current, a source of direct current, an adjustable-speed, alternating-current electric motor of the induction motor type having relatively rotatable members, one carrying a three-phase primary exciting winding and the other carrying both a short-circuited secondary winding and an auxiliary three-phase secondary winding in series with the primary winding and in inductive relation to the primary flux, at least one winding connected to the direct-current source in inductive relation to said windings to control the impedance of the primary winding circuit and thereby control the amount of power current flowing in the secondary windings, and means including adjustable resistance and reactance in circuit with the primary and auxiliary secondary windings to further control the power current in the primary winding, said primary winding being star-connected in series with said resistance and impedance and said auxiliary secondary winding.

10. In combination, a source of alternating current, a source of direct current, an adjustable-speed, alternating-current electric motor of the induction motor type having relatively rotatable members, one carrying a primary exciting winding and the other carrying a secondary winding inductively related to the first winding, direct-current control windings, one on each member, and arranged to produce a number of alternate poles, each stationary with respect to the corresponding member, and means for variably energizing said direct-current windings to modify the normal flux produced by said primary winding.

ANTHONY J. PORSKIEVIES.